L. L. MILES & McCLELLAN C. FULLENLOVE.
SHOCK ABSORBER.
APPLICATION FILED JULY 16, 1914.
1,159,697.
Patented Nov. 9, 1915.
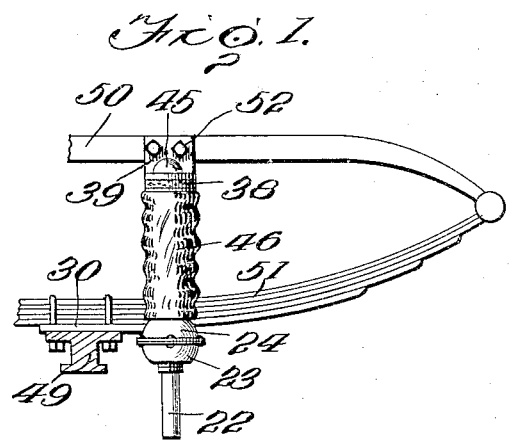
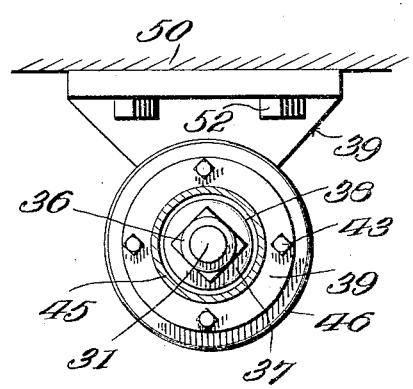
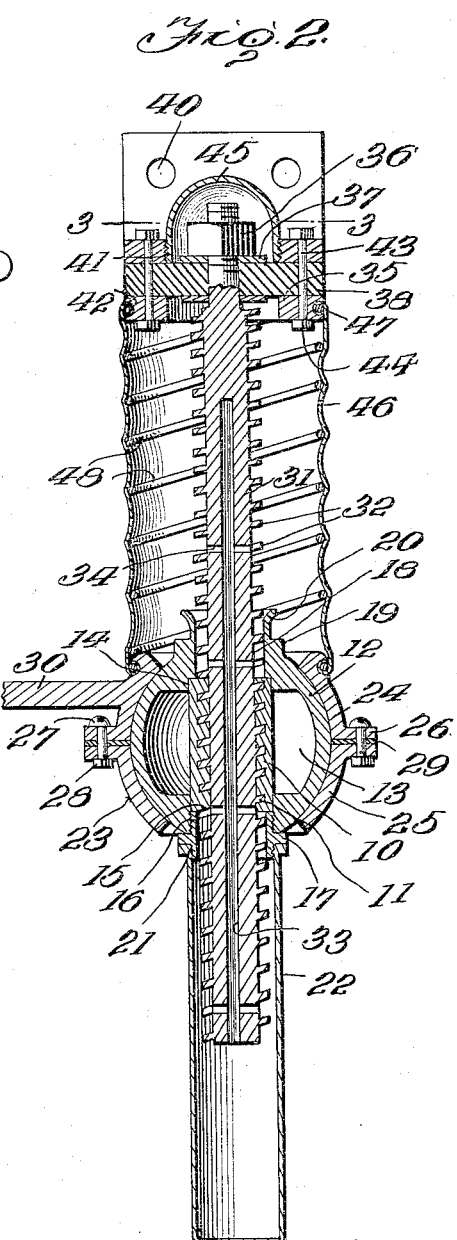
Inventors
L. L. Miles and
Mc. C. Fullenlove.

UNITED STATES PATENT OFFICE.

LEE L. MILES AND McCLELLAN C. FULLENLOVE, OF LOUISVILLE, KENTUCKY, ASSIGNORS TO HELICAL SHOCK ABSORBER COMPANY, OF LOUISVILLE, KENTUCKY.

SHOCK-ABSORBER.

1,159,697.  Specification of Letters Patent.  Patented Nov. 9, 1915.

Application filed July 16, 1914. Serial No. 851,359.

*To all whom it may concern:*

Be it known that we, LEE L. MILES and McCLELLAN C. FULLENLOVE, citizens of the United States, residing at Louisville, in the county of Jefferson and State of Kentucky, have invented certain new and useful Improvements in Shock-Absorbers, of which the following is a specification.

Our invention relates to new and useful improvements in shock absorbers for vehicles, the primary object of our invention being the provision of a shock absorber which may be applied to a vehicle, in addition to the ordinary springs, and which will take up strain under abnormal conditions and prevent extreme distortion of the springs and consequent undue movement of the vehicle with respect to the running gear.

A further object of our invention is to provide a shock absorber which may be applied with equal effectiveness to vehicles of all types, although particularly applicable to motor vehicles.

The required resistance is obtained in our shock absorber by the friction between interengaging threads of a plurality of telescopic members attached to relatively movable parts of the vehicle. As is well known, by those acquainted with motor vehicles, the body of the car not only moves vertically with respect to the running gear, due to unevenness of the roads, but also at times, such as when rounding curves, has transverse movement with respect to the running gear, and at other times, due to quick starting and stopping, has a slight longitudinal movement with respect to the running gear.

In this connection, a still further object of our invention is to so secure the telescopic or interengaging members of our shock absorber to the running gear and vehicle body as to constantly maintain them in proper alinement with each other, irrespective of the direction or amount of movement of the vehicle body with respect to the running gear.

A still further object of our invention is to provide for satisfactory lubrication of all bearing surfaces, and particularly for the lubrication of the interengaging threads of the telescopic members. And a still further object of our invention consists in the provision of a flexible housing or casing to prevent admission of moisture and dirt to the bearing surfaces.

With these and other objects in view, our invention will be more fully described, illustrated in the accompanying drawing, and then specifically pointed out in the claims which are attached to and form a part of this application.

In the drawing: Figure 1 is a fragmentary sectional view of a vehicle spring and frame member, showing our shock absorber applied thereto, the shock absorber being shown in side elevation; Fig. 2 is a central vertical sectional view taken through the shock absorber; Fig. 3 is a transverse sectional view taken on the line 3—3 of Fig. 2.

Corresponding and like parts are referred to in the following description and indicated in all the views of the drawing by the same reference characters.

The preferred embodiment of our shock absorber includes an internally threaded member adapted for attachment to the running gear of a vehicle, either directly or through the medium of a spring, and an externally threaded member telescopically engaging with the first member and adapted for attachment to the body of the vehicle. The first of these members includes an elongated, cylindrical nut 10, internally threaded as shown at 11 and seated in an inner spherical bearing member, indicated as a whole by the numeral 12. This bearing member is hollow to provide a lubricant chamber 13 and at its top is interiorly recessed as shown at 14 to form a seat for the upper end of the nut 10, which nut is inserted through an opening 15 formed in the lower wall of the bearing member 12, the upper and lower walls of such bearing member being thickened to insure sufficient strength. The outermost portion of the opening 15 in the lower wall is internally threaded to receive the externally threaded shoulder 16 of a clamp nut 17, this shoulder engaging against the lower end of the friction nut 10 to prevent its longitudinal movement. This engagement, however, is not such as to prevent free turning of the nut 10 in the seat 14 and in the upper portion of the opening 15, this seat and opening in effect forming bearings for the nut 10. The upper portion of the bearing member 12 is provided with a threaded bore 18, the threads of which correspond to and form continuations of the threads of the nut 10 and surrounding this bore is an encircling shoulder 19 having angularly disposed faces, whereby the bearing member 12 may be held against turning during application of the nut 17. Above this shoulder 19 is an upwardly extended, annular, flared flange 20 which forms a drip flange for oil, as will be later explained. The nut 17 is further provided with a threaded shoulder 21 to receive the externally threaded upper end of a tubular lubricant chamber or cup 22, the lower end of which is closed.

The bearing member 12 is supported for universal movement in a second bearing member, indicated as a whole by the numeral 23 which in turn is adapted for attachment to any suitable part of the running gear of a vehicle. This second bearing member 23 is formed in upper and lower sections 24 and 25, each substantially semi-spherical in shape to correspond to and engage snugly about the spherical bearing member 12, when assembled, and each provided with an opening through which the upper and lower portions of such bearing member extend, these openings being of sufficient size to permit a quite considerable universal movement of the bearing member 12. The sections 24 and 25 of the bearing member 23, at their abutting edges, are provided with circumferential flanges 26 perforated to receive a plurality of clamping bolts 27 having nuts 28 by means of which such sections are secured together about the bearing member 12, a packing ring 29 of rubber, leather or other suitable material, being interposed between these flanges to prevent leakage of oil from the bearing and also to prevent admission of dust or moisture to the bearing. One of these bearing sections 24 or 25, preferably the former, is provided with a laterally projecting arm 30 perforated adjacent its free end to receive bolts or other fastening devices by means of which it may be secured to the running gear of the vehicle. This arm may be either rigid or resilient as deemed advisable, depending upon the type of vehicle with which the shock absorber is to be employed and upon the position which the shock absorber is to occupy when applied.

The second of the telescopic members, previously referred to, includes a plunger, indicated as a whole by the numeral 31, in the form of a shaft externally threaded as shown at 32 to frictionally engage in the threads of the bearing member 12 and friction nut 10. This plunger 31 extends completely through the bearing member 12 and into the upper portion of the oil cup 22 and is provided throughout the greater portion of its length with a centrally formed lubricant passage 33 which opens through the lower end of the plunger to communicate with the lubricant cup 22 and which is provided at spaced intervals with radial branches 34 by means of which lubricant may be supplied to the threads of the friction nut 10 and bearing member 12.

The upper end of the plunger 31 is reduced to provide a shoulder 35 and the reduced portion screw-threaded to receive a clamping nut 36. This reduced portion is passed through spaced washers 37 between which is located one or more relatively thick disks 38 of leather, these disks being substantially equal in diameter to the exterior diameter of the bearing member 23. A substantially L-shaped attaching and supporting bracket 39 has its vertical arm perforated as at 40 to receive attaching bolts or other suitable fastening devices and its other arm apertured as shown at 41 for the free passage of the upper end of the plunger and its clamping nut 36. When assembled, the leather disks 38 bear against the lower face of this latter arm of the bracket. A collar or ring 42 bears against the lower face of the leather disk 38 having an opening corresponding in size to the opening in the bracket arm and bolts 43 are passed through the bracket arm, leather disks and collar 42 and secured in place by nuts 44 to firmly clamp the disks between the bracket and collar 42. As will be readily apparent, the plunger 31 is thus firmly secured to the bracket and at the same time free for slight universal movement with respect thereto, due to the yieldability of the leather disks.

The upper portion of the opening 41 in the bracket arm is threaded to receive the threaded edge portion of a substantially semi-spherical dust cap 45 by means of which admission of dust and moisture to the upper face of the leather disk is prevented. In order to protect that portion of the plunger 31, extending between the bracket 39 and bearing 23, from dust and moisture, we provide a collapsible, tubular casing 46, preferably formed of leather or rubber and secured to the collar 42 and section 24 of the bearing member 23 by clamp rings 47 seating in peripheral grooves formed in the outer faces of such members. This tubular casing is held in extended position, and consequently out of contact with the plunger 31, by means of a light helical spring 48 which in effect forms a supporting frame for casing without in any way affecting its capability for longitudinal expansion and contraction.

In use, the supporting brackets 30 and 39 are attached to relatively movable parts of the vehicle, the former bracket being preferably attached to the running gear, while the latter is attached to the body. For instance, in Fig. 1, we have illustrated the shock absorber employed between the axle 49 and side bar 50 of the vehicle body, a semi-elliptic spring 51 being employed between the axle and side bar in the usual manner. As there shown, the bracket 30 is attached to the axle 49, while the bracket 39 is secured to the side bar 50 by bolts 52.

Upon assembling the shock absorber, the chamber 13 and lubricator cup 22 are both filled, or at least partially filled, with light lubricating oil. It will therefore be clear that reciprocation of the plunger 31 through the friction nut 10 will cause its lower end to move in the lubricator cup 22, thereby acting as a piston to force the oil through the lubricant passage 30 and its branch passages to thoroughly lubricate all bearing surfaces between the friction nut 10 and plunger. Any excess of this oil discharged above the bearing member 12 will be caught by the drip flange 20 and caused to flow back into the chamber 13. A certain amount of this oil may overflow the drip flange to lubricate the bearing surfaces of the bearing members 12 and 23 or such surfaces may be lubricated by direct application of oil.

From the foregoing description it will be apparent that the co-acting telescopic members, being each mounted for limited universal movement with respect to their supporting brackets, will, at all times, be in direct alinement with each other and any side strain upon such members is therefore avoided. Because of this, the resistance offered by the forcing of the non-revolving plunger 31 through the revolving friction nut 10 will, at all times, be constant, irrespective of the direction from which force is applied to the plunger.

It will further be apparent that the resistance offered by the shock absorber against movement is directly proportional to the speed and extent of the movement against which the shock absorber acts, the shock absorber thus providing a variable resistance which automatically changes to meet all requirements.

Having thus described the invention, what is claimed as new is:

1. A shock absorber including a ball and socket bearing device, means for attaching the socket member of such device to the running gear of a vehicle, an internally threaded nut supported by the ball member, an externally threaded plunger engaging in the nut, a flexible member clamped to one end of the plunger, a bracket adapted for attachment to the vehicle body, and means for clamping the flexible member to the bracket.

2. A shock absorber including a ball and socket bearing device, means for attaching the socket member of such device to the running gear of a vehicle, an internally threaded nut supported by the ball member, an externally threaded plunger engaging in the nut, a flexible member clamped to one end of the plunger, a bracket adapted for attachment to a vehicle body, means for clamping the flexible member to the bracket, and a flexible housing extending between the flexible member and the socket member and spaced from the plunger.

3. A shock absorber including brackets adapted for attachment to relatively movable parts of a vehicle, a rotatably mounted nut, one of the brackets forming a universal joint support for the nut, a flexible member carried by the other bracket, and an externally threaded plunger secured at one end to the flexible member and having threaded engagement with the nut.

4. A shock absorber including a ball and socket bearing device, means for attaching the socket member of such device to the running gear of a vehicle, an internally threaded nut rotatably supported within the ball member, the ball member having a flanged opening in alinement with the nut, an externally threaded plunger having threaded engagement with the nut and extending through the opening and through an opening formed in the opposite side of the ball, means for attaching one end of the plunger to a relatively movable part of the vehicle, a lubricating device secured to the ball member and surrounding the opposite end of the plunger, and means operable through reciprocation of the plunger for forcing lubricant from the lubricating device into the space between the flange about the opening of the ball member and the plunger.

5. A shock absorber including a ball and socket bearing device, means for attaching the socket member of such device to the running gear of a vehicle, an internally threaded nut rotatably supported within the ball member, the ball member having a flanged opening in alinement with the nut, an externally threaded plunger having threaded engagement with the nut and extending through the opening and through an opening formed in the opposite side of the ball, means for attaching one end of the plunger to a relatively movable part of the vehicle, a lubricating device secured to the ball member and surrounding the opposite end of the plunger, and means operable through reciprocation of the plunger for forcing lubricant from the lubricating device into the space between the flange about the opening of the ball member and the plunger, said means including a duct formed longitudinally of the plunger and opening through its free end, and transverse passages through the plunger.

In testimony whereof we affix our signatures in presence of two witnesses.

LEE L. MILES. [L. S.]
  McCLELLAN C. FULLENLOVE. [L. S.]

Witnesses:
 C. C. HIEATT,
 GEO. HENRIOTT.

Copies of this patent may be obtained for five cents each, by addressing the "Commissioner of Patents, Washington, D. C."